Nov. 10, 1964  O. R. HAVELKA ETAL  3,156,259
RELIEF VALVE
Filed March 19, 1962

Inventor
OTAKAR R. HAVELKA &
JOSEPH KAMPF
by:

United States Patent Office 3,156,259
Patented Nov. 10, 1964

3,156,259
RELIEF VALVE
Otakar R. Havelka and Joseph Kampf, Preston, Ontario, Canada, assignors to Kralinator Filters Limited, Preston, Ontario, Canada
Filed Mar. 19, 1962, Ser. No. 180,721
3 Claims. (Cl. 137—516.23)

This invention relates to relief valves and more particularly to relief valves which will have particular application for use with disposable filters such as are commonly employed in the lubricating systems of internal combustion engines.

In such applications where the filter and its relief valve are disposable, the cost of the relief valve as well as the filter becomes of paramount importance. At the same time the relief valve must open to allow the lubricating oil to bypass the filtering media before the latter becomes plugged to an extent that the resistance to oil flow would reduce the oil pressure at the bearings below a predetermined desired minimum.

In this connection not only must the relief valve open at the required pressure increase on the supply side of the filter occasioned by the plugging of the filtering media but to ensure full flow lubrication it is an important desideratum that the relief valve provide a full flow capacity therethrough at a pressure only slightly above opening pressure.

Moreover to avoid by-passing contaminants which have settled out at the bottom of the filter it is highly desirable that the relief valve be located at the top or head of the filter but since this point is where the oil inlet and outlet and seal therebetween is normally located the space available for the relief valve is very limited necessitating a compact valve structure if the size of the filter is not to be increased.

It is therefore the object of this invention to provide a relief valve of extremely simple and inexpensive construction which will be very compact yet will provide for large volume flow therethrough under pressure only slightly larger than opening pressure.

Another important object is to provide a relief valve as aforesaid which will have a minimum of separate parts and which can be very quickly and easily assembled in manufacture.

The principal feature of the invention resides in forming the valve body to have a preferably annular grouping of ports concentrically surrounding a preferably cylindrical sleeve portion through which by-passed fluid is adapted to flow, the ports opening into a groove against which a valve disc is adapted to seat, and the valve body having extensions adapted to form guides for guiding the valve disc and adapted to provide for supporting the valve disc actuating spring, the arrangement being such that the valve body and extensions can be formed as a single moulded piece.

More particularly, according to the preferred form of the invention, the ports have straight end walls which are substantially radial of the central sleeve and side walls which are arcuate to conform to the annular port grouping.

Again, according to the preferred form of the invention, the valve body extensions are formed as resilient hooks adapted to support the valve disc closing spring and resiliently displaceable for assembly of the spring thereon to thereby facilitate manufacture.

Still another feature resides in providing upwardly projecting ribs between adjacent ports to provide strengthening and to preclude port blockage by any overlying member which may be employed in the filter.

These and other objects and features will become apparent from the following detailed description taken in conjunction with the accompanying drawings, in which.

Figure 1:
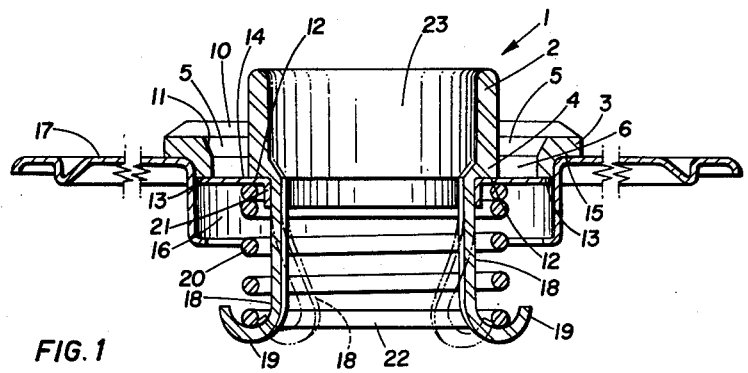
FIGURE 1 is a mid-vertical sectional view of a relief valve embodying the invention and illustrating the manner of its mounting.
Figure 2:
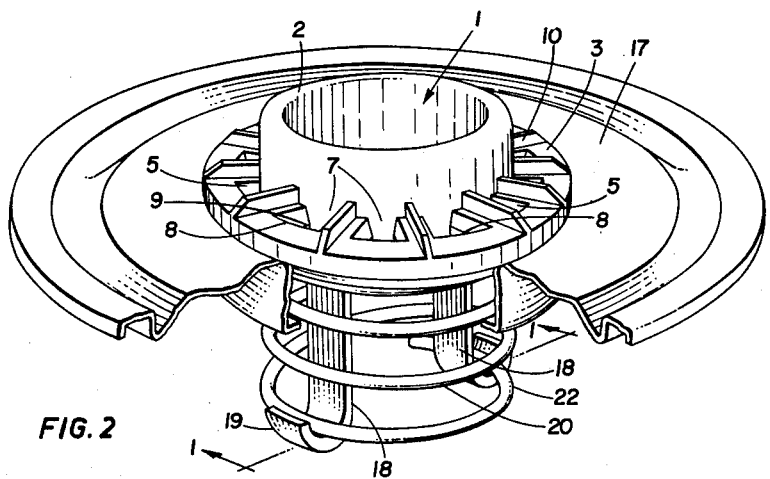
FIGURE 2 is a perspective view of the relief valve of FIGURE 1 again showing its relationship with the end wall of a filter cartridge which is partially broken away.

With reference first to FIGURES 1 and 2, the relief valve illustrated comprises a valve body generally designated at 1 which is in the form of a central cylindrical sleeve portion 2 provided with a surrounding flange portion 3 adjacent to the base 4 thereof.

As best seen in FIGURE 2, the flange 3 is formed with a cylindrical grouping of ports 5 concentrically ringing the sleeve portion 2.

The underside of the flange portion 3 is provided with an annular groove 6 registering with the annular grouping of ports 5 so that the ports are connected by the groove.

Each of the ports 5 has a radially inner wall 7 and a radially outer wall 8 which preferably are of arcuate form so that they are concentric with the sleeve portion 2. End walls 9 of the ports are preferably straight and extend substantially radially of the central sleeve portion 2.

Preferably the flange portion 3 is provided on its upper surface with upstanding ribs 10 between the ports 5.

The radially outer wall 8 of the ports may also be slightly bevelled as shown at 11 in FIGURE 1.

The base 4 of the valve body is provided with an annular bearing surface 12 disposed radially inwardly of the groove 6 while the underside of the flange 3 is provided with a corresponding annular bearing surface 13 radially outwardly of the groove 6. These annular bearing surfaces 12 and 13 are adapted to form together an annular seat for a valve plate 14 which, when seated on the valve seat 12, 13 will close the annular groove 6.

The underside of the flange 3 is also provided with an annular shoulder formation 15 by means of which the valve body is adapted to be located in a central opening 16 provided in the end plate 17 of a filter element.

Formed integrally with the valve body 1 are a pair of downwardly extending arms or extensions 18 having their lower ends formed into hooks 19.

The relatively complex valve body and integral extensions are adapted to be moulded of a suitable plastic material to form a one-piece unit with the requirement that the material employed in the moulding have a sufficiently high melting point that it may be used for instance in the lubricating system of an internal combustion engine and have sufficient resiliency so that the extensions or arms 18 may have a measure of flexibility for displacement from the solid line showings in FIGURE 1 to the dotted line showings in FIGURE 1 for purposes of assembly of a coil compression spring 20 for actuating the valve plate 14 as hereinafter more fully described.

A material which has been found particularly suitable for such a valve body is the material sold under the trade mark "Nylon."

As shown particularly in FIGURE 1, the annular valve plate 14 is provided with a downturned flange 21 which is adapted to co-operate with the arms or extensions 18 so that the latter form guides for controlling the movement of the valve plate as it moves towards and from the valve seat 12, 13.

The coil compression spring 20, as shown in FIGURE 2, is of very simple form comprising a length of coil spring wire and to assemble the valve, because of the resiliency of the arms or extensions 18, these can be compressed together from the solid line showings of FIGURE 1 to the dotted line showing, at which time the annular valve plate 12 can be slipped thereover into position followed by the simple spring 20. Upon release the arms 18 will snap outwardly beneath the lowermost coil 22 of the spring to thus fix or anchor the lower spring end with the spring in a position to urge the valve plate to the closed position sealing the annular groove 6.

It will be understood that oil or other liquid or fluid will normally enter the filter element of which the end plate 17 forms a part through suitable filtering media (not shown) and will escape through the passage 23 defined by the sleeve portion 2. However, if for some reason, the filtering media becomes plugged the liquid or fluid to be delivered through the passage 23 will, upon increase in the pressure system, force the valve plate 14 off the seat 12 and 13 to afford the requisite by-pass.

Because the valve body also incorporates the outlet passage 23 through the incorporation of the sleeve portion 2 which is a highly desirable arrangement, it will be appreciated that the space available for the ports 5 is extremely limited and it has been found that despite such limited space the configuration of the ports 5 as illustrated coupled with the connecting groove 6 provides for a large volume by-pass flow immediately the valve plate 14 lifts off the valve seat 12, 13.

It will be appreciated that the compression force of the spring 20 will be selected so that the valve plate 14 will lift from its seat 12, 13 at the desired predetermined pressure and at only a slightly larger pressure will provide sufficient clearance to enable the full flow capacity of the ports and groove to be maintained so that lubrication or other desired flow will not be impaired upon plugging of the filter media.

It will be understood that because of the relatively complex formation of the valve body 1 and its integral valve plate guiding and spring supporting arms 18, the unit could not economically be machined. Thus, where the valve is to be used as a temporary valve, for instance, in a throw-away type filter and cost is an important factor, the moulding of the valve body and arms as an integral one-piece economical unit is of special importance.

The provision of the ribs 10 not only provides for the strengthening of the valve body 1, but also precludes any adjacent or adjoining part of the filter unit seating down on and sealing off the ports 5.

Figure 3:
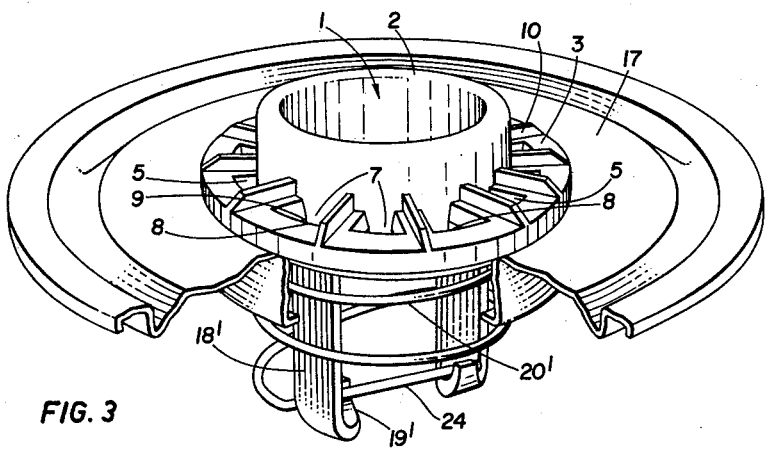
FIGURE 3 is a view similar to FIGURE 2 but illustrating a slightly modified form of the invention.

While FIGURES 1 and 2 illustrate thep referred embodiment of the invention, it will be understood that the invention may take various other form, as illustrated in FIGURE 3 where like parts are designated by the same numerals as in the embodiment of FIGURES 1 and 2, and perform the same function.

In FIGURE 3 there is illustrated an arrangement wherein the arms or extensions 18' of the valve body 1 have inturned hooks 19' which enables the valve body 1 to be moulded with a simple two-part mould, but requires the coiled spring 20' to be provided with a cross wire 24 at its lower end to seat in the inturned hooks 19'.

It will also be understood that the embodiments illustrated simply show some of the variations possible in constructing relief valves according to the invention, and that other variations in the details may be made without departing from the spirit of the invention or scope of the appended claims.

What we claim is:
1. A relief valve comprising a plastic valve body having a plurality of ports, a valve plate, said valve body having a valve seat against which said plate is adapted to close and having said ports opening through said seat and means for urging said valve plate to close said ports comprising a pair of resilient arms integral with said valve body said arms having hooked ends and a coil compression spring bearing against said valve plate and supported by said hooked ends.

2. A relief valve as claimed in claim 1 in which said integral resilient pair of arms are turned outwardly to form said hooked ends and said coil spring is sleeved on said arms to encircle same, the resiliency of said arms being sufficient to permit assembly of said spring thereon.

3. A relief valve as claimed in claim 1 in which said integral resilient pair of arms are turned inwardly to form hooks and said spring is provided with a transverse element at one end adapted to seat on said hooks.

References Cited by the Examiner
UNITED STATES PATENTS

| | | | |
|---|---|---|---|
| 190,469 | 5/77 | Corliss | 137—516.21 |
| 1,444,452 | 2/23 | Bigelow. | |
| 1,447,057 | 2/23 | Beckman | 251—37 XR |
| 1,658,403 | 2/28 | Boyer | 251—337 |
| 1,789,209 | 1/31 | Asbury | 251—337 |
| 2,077,040 | 4/37 | Creveling | 251—337 XR |
| 2,320,080 | 2/43 | Hill | 251—337 XR |
| 2,905,188 | 9/59 | Loew | 137—543.15 |

M. CARY NELSON, *Primary Examiner.*

ISADOR WEIL, *Examiner.*